United States Patent
Fujisawa et al.

(10) Patent No.: US 11,710,095 B2
(45) Date of Patent: Jul. 25, 2023

(54) VEHICLE SERVICE PROVIDING APPARATUS AND VEHICLE SERVICE PROVIDING METHOD

(71) Applicant: Honda Motor Co., Ltd., Tokyo (JP)

(72) Inventors: Koki Fujisawa, Tokyo (JP); Satoru Okubo, Tokyo (JP); Hiroki Yokoyama, Tokyo (JP); Takuro Masuda, Tokyo (JP)

(73) Assignee: Honda Motor Co., Ltd., Tokyo (JP)

(*) Notice: Subject to any disclaimer, the term of this patent is extended or adjusted under 35 U.S.C. 154(b) by 872 days.

(21) Appl. No.: 16/735,045

(22) Filed: Jan. 6, 2020

(65) Prior Publication Data
US 2020/0219056 A1    Jul. 9, 2020

(30) Foreign Application Priority Data
Jan. 8, 2019  (JP) .................................. 2019-001301

(51) Int. Cl.
*G06Q 50/30*     (2012.01)
*G06Q 10/0835*   (2023.01)
(Continued)

(52) U.S. Cl.
CPC ..... *G06Q 10/0835* (2013.01); *G06Q 10/0834* (2013.01); *G06Q 30/0208* (2013.01); *G06Q 50/30* (2013.01)

(58) Field of Classification Search
CPC . G06Q 10/0834; G06Q 10/0835; G06Q 50/30
See application file for complete search history.

(56) References Cited

U.S. PATENT DOCUMENTS

| 2015/0248689 A1* | 9/2015 | Paul | G06Q 50/30 |
| | | | 705/14.23 |
| 2016/0099927 A1* | 4/2016 | Oz | G07C 5/0808 |
| | | | 726/9 |

(Continued)

FOREIGN PATENT DOCUMENTS

| CN | 108171460 A | 6/2018 |
| CN | 108520384 A | 9/2018 |

(Continued)

OTHER PUBLICATIONS

Wang et al., Ridesharing as a Service: Exploring Crowdsourced Connected Vehicle Information for Intelligent Package Delivery, 2018 IEEE/ACM 26th International Symposium on Quality of Service (IWQoS), Banff, AB, Canada, 2018, pp. 1-10 (Year: 2018).*

(Continued)

*Primary Examiner* — Rupangini Singh
(74) *Attorney, Agent, or Firm* — Duft & Bornsen, PC (57) ABSTRACT

A vehicle service providing apparatus includes an electronic control unit having a microprocessor and memory. The memory is configured to perform storing map data including route position data. The microprocessor is configured to perform acquiring reservation application data for using the vehicle including destination data, calculating a route to the destination base on the map data stored and the destination data acquired, acquiring parcel data including fee revenue data for a delivery of the parcel, determining whether the user satisfies a predetermined requirement for delivering the parcel when using the vehicle based on the parcel data in the acquiring and the route calculated in the calculating, deciding the incentive based on the parcel data in the acquiring when it is determined that the user satisfies the predetermined requirement; and outputting incentive data of the incentive in the deciding to the user.

10 Claims, 4 Drawing Sheets

(51) Int. Cl.
*G06Q 30/0208* (2023.01)
*G06Q 10/0834* (2023.01)

(56) References Cited

U.S. PATENT DOCUMENTS

| | | | |
|---|---|---|---|
| 2016/0364679 A1* | 12/2016 | Cao | G06Q 50/30 |
| 2017/0039890 A1* | 2/2017 | Truong | G07C 5/02 |
| 2017/0132532 A1* | 5/2017 | Myers | G06Q 10/1097 |
| 2018/0189717 A1 | 7/2018 | Cao | |
| 2018/0365629 A1* | 12/2018 | Zeng | G08G 1/202 |
| 2019/0304044 A1* | 10/2019 | Guo | G06Q 50/30 |
| 2022/0194435 A1* | 6/2022 | Zhao | G07F 17/12 |

FOREIGN PATENT DOCUMENTS

| | | |
|---|---|---|
| CN | 108960711 A | 12/2018 |
| JP | 2012215921 A | 11/2012 |
| JP | 2013075742 A | 4/2013 |
| JP | 2017091409 A | 5/2017 |
| WO | WO-2019203806 A1 * | 10/2019 |

OTHER PUBLICATIONS

Japanese office action; Application 2019-001301; dated Mar. 22, 2022.
Chinese office action; Application 202010006535.5; dated Jul. 4, 2022.

* cited by examiner

VEHICLE SERVICE PROVIDING APPARATUS AND VEHICLE SERVICE PROVIDING METHOD

CROSS-REFERENCE TO RELATED APPLICATION

This application is based upon and claims the benefit of priority from Japanese Patent Application No. 2019-001301 filed on Jan. 8, 2019, the content of which is incorporated herein by reference.

BACKGROUND OF THE INVENTION

Field of the Invention

This invention relates to a vehicle service providing apparatus and a vehicle service providing method for providing service to a user of a vehicle.

Description of the Related Art

As conventional apparatuses of this type are known ones for providing car-sharing users with discount service. An example of such an apparatus is described in JP2012-215921A. In accordance with the apparatus taught by JP2012-215921A, when congestion is severe at a station that is a user's destination, the apparatus indicates another station as an alternative destination and gives a user who accepts the indicated station a discount proportionate to increased travel time owing to using the alternative station.

However, a service that applies a discount proportionate to increase in required travel time, such as that according to the apparatus of JP2012-215921A, is inadequate as a service for promoting vehicle utilization.

SUMMARY OF THE INVENTION

An aspect of the present invention is a vehicle service providing apparatus, configured to offer an incentive to a user of a shared vehicle. The user delivers a parcel when using the vehicle. The vehicle service providing apparatus includes: an electronic control unit having a microprocessor and a memory connected to the microprocessor. The memory is configured to perform storing a map data including a route position data. The microprocessor is configured to perform: acquiring a reservation application data for using the vehicle including a destination data; calculating a route to the destination base on the map data stored and the destination data acquired; acquiring a parcel data including a fee revenue data for a delivery of the parcel; determining whether the user satisfies a predetermined requirement for delivering the parcel when using the vehicle based on the parcel data in the acquiring and the route calculated in the calculating; deciding the incentive based on the parcel data in the acquiring when it is determined that the user satisfies the predetermined requirement; and outputting an incentive data of the incentive in the deciding to the user.

Another aspect of the present invention is a vehicle service providing method, configured to offer an incentive to a user of a shared vehicle. The user delivers a parcel when using the vehicle. The vehicle service providing method includes: storing a map data including a route position data, wherein acquiring a reservation application data for using the vehicle including a destination data; calculating a route to the destination base on the map data stored and the destination data acquired; acquiring a parcel data including a fee revenue data for a delivery of the parcel; determining whether the user satisfies a predetermined requirement for delivering the parcel when using the vehicle based on the parcel data in the acquiring and the route calculated in the calculating; deciding the incentive based on the parcel data in the acquiring when it is determined that the user satisfies the predetermined requirement; and outputting an incentive data of the incentive in the deciding to the user.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

An embodiment of the present invention is explained with reference to FIGS. 1 to 4 in the following. A vehicle service providing apparatus according to this embodiment of the present invention is configured for use by, for example, a company engaged in car-sharing or rental car business to provide a service that offers users of vehicles available for use by numerous people (shared vehicles) incentives when a predetermined condition is met, thereby promoting use of the shared vehicles.

In the rental car business, vehicle rentals are concluded directly between renters and rental station attendants. In contrast, the car-sharing business differs from the rental car business in the point that customers rent vehicles using a pre-registered IC card or similar without aid of a station attendant. Although the vehicle service providing apparatus according to the present embodiment can be utilized in either the car-sharing business or the rental car business, it is explained in the following taking application to the car-sharing business as an example.

Figure 1:
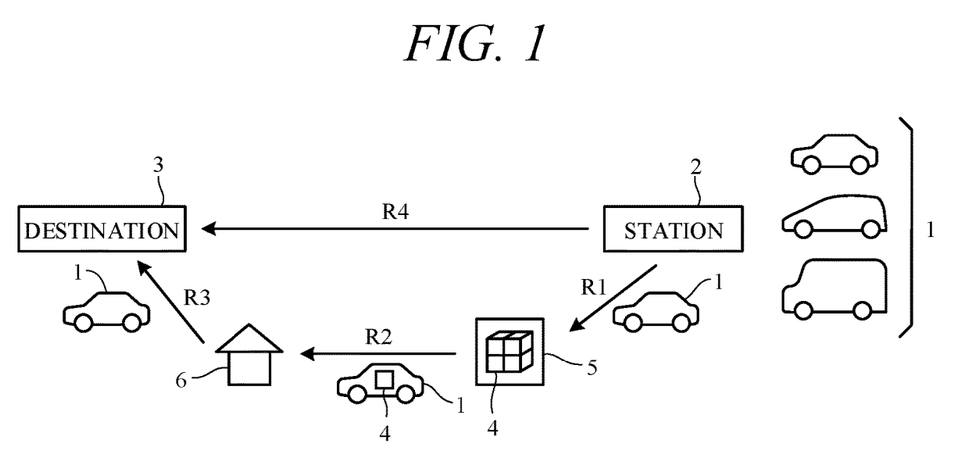
FIG. 1 is a diagram showing an example of actions performed by a vehicle service providing apparatus according to an embodiment of the present invention.

FIG. 1 is a diagram showing an example of actions performed by the vehicle service providing apparatus according to an embodiment of the present invention. Vehicles 1 offered by the car-sharing business include sedans, minivans, vans, station wagons, and other four-wheel vehicles of different builds (body size, luggage compartment capacity etc.). The vehicles 1 are parked in a parking lot (termed "station") 2 before and after use by users. Users therefore use the vehicles 1 with the station 2 as their departure and return location. The diagram of FIG. 1 illustrates an example in which a user having received an order from a delivery company performs all aspects of parcel 4 transport from pickup to delivery on the outbound leg of a roundtrip between the station 2 and a destination 3. Alternatively, delivery of the parcel 4 can be performed on the return leg from the destination 3 to the station 2.

In the example of FIG. 1, the user leaves the station 2, stops by a distribution center 5 of the delivery company to collect the parcel 4 (route segment R1), and then, with the parcel 4 on board the vehicle 1, proceeds to a delivery address (e.g., a home) 6 to hand over the parcel 4 to the other party (addressee) at the delivery address 6 (route segment R2). The user then drives the vehicle 1 to the destination 3 (route segment R3). As this amounts to undertaking part of the delivery company's work, the user receives remuneration from the delivery company and the vehicle 1 rental fee is discounted by the amount of the remuneration.

Route segments R1 to R3 from the station 2, via the distribution center 5 and delivery address 6, to the destination 3 (termed "detour route") is longer than and takes more time to travel than route segment R4 running directly from the station 2 to the destination 3 (termed "direct route"). As rental period of the vehicle 1 is therefore likely to increase, the rental charge is apt to increase. However, if, for example, users are offered a vehicle rental charge service that discounts the rental charge by at least the rental charge increase, more users may be induced to deliver parcels on the way to the destination 3 despite the somewhat longer time required, and this would in turn increase frequency of use of the vehicles 1. Moreover, such a service could conceivably lead to an increase in users who utilize the vehicles 1 mainly for the purpose of transporting parcels. And from the viewpoint of the delivery company, such subcontracting of parcel delivery to vehicle 1 users helps to alleviate shortage of delivery personnel. In order to implement such favorable effects to the utmost, the present embodiment provides a vehicle service providing apparatus configured as set out in the following.

Figure 2:
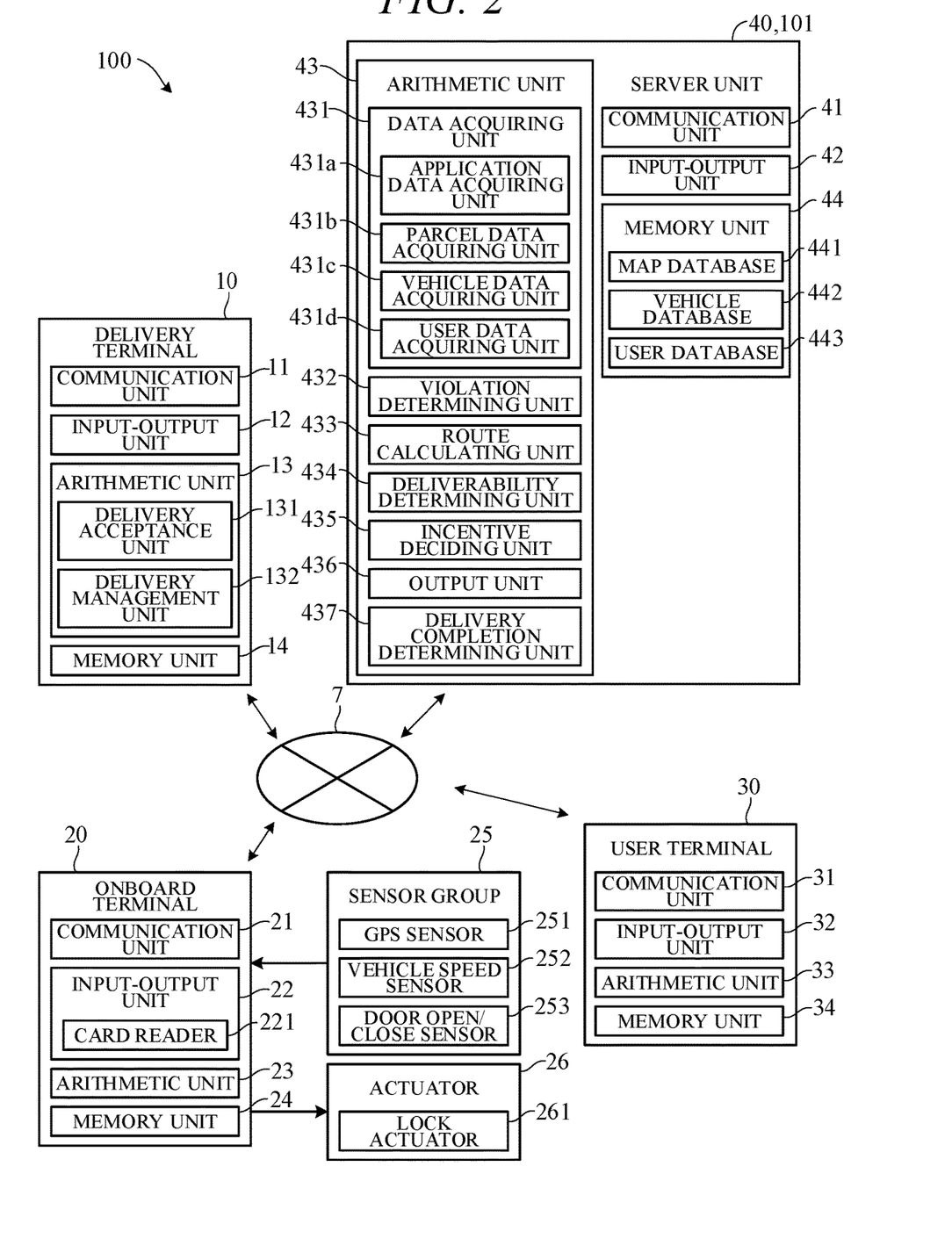
FIG. 2 is a block diagram showing overall configuration of a vehicle service providing system incorporating the vehicle service providing apparatus according to the embodiment of the present invention.

FIG. 2 is a block diagram showing overall configuration of a vehicle service providing system 100 incorporating a vehicle service providing apparatus 101 according to an embodiment of the present invention. As shown in FIG. 2, the vehicle service providing system 100 comprises delivery terminals 10 owned by a delivery company engaged in parcel delivery business, onboard terminals 20 installed in vehicles 1 owned by a company engaged in car-sharing service, user terminals 30 carried by users utilizing the vehicles 1, and a server unit 40. The vehicle service providing apparatus 101 according to the present embodiment is configured chiefly by the server unit 40.

The delivery terminal 10, onboard terminals 20, user terminals 30 and server unit 40 are connected to a communication network 7 such as a wireless communications network, Internet network or telephone network. Although for convenience of illustration FIG. 2 shows only one each of the delivery terminals 10, onboard terminals 20 and user terminals 30, the vehicle service providing system 100 can be configured to include delivery terminals 10 of multiple delivery companies, onboard terminals 20 of multiple vehicles 1, and user terminals 30 of multiple users. While only a single server unit 40 is shown in FIG. 2, functions indicated in the server unit 40 of FIG. 2 can be divided among multiple server units.

The delivery terminal 10 comprises a communication unit 11, input-output unit 12, arithmetic unit 13, and memory unit 14.

The communication unit 11 is configured to be capable of communicating wirelessly with the server unit 40 through the communication network 7. The communication unit 11 transmits information regarding parcels consigned for delivery by customers, namely, "parcel data," to the server unit 40. Parcel data include, inter alia, information regarding parcel delivery point (e.g., delivery address 6 of FIG. 1) and parcel collection point (e.g., distribution center 5 of FIG. 1), parcel size, weight and item name, desired parcel delivery date/time, and desired parcel collection date/time.

The input-output unit 12 is a so-called human-machine interface (HMI) having, inter alia, a delivery company operable keyboard, a mouse, a monitor, a touch panel and a printer. The delivery company can use the input-output unit 12 to input parcel data associated with parcel IDs assigned for parcel identification.

The arithmetic unit 13, which is equipped with a CPU (processor), performs prescribed processing based on, inter alia, signals input through the input-output unit 12, signals received through the communication unit 11 from outside the delivery terminal 10 and data stored in the memory unit 14, and outputs control signals to the communication unit 11, input-output unit 12, and memory unit 14.

The arithmetic unit 13 has a delivery acceptance unit 131 and a delivery management unit 132 as functional constituents. The delivery acceptance unit 131 accepts parcel delivery requests from customers via telephone, email, facsimile and the like. The delivery acceptance unit 131 concurrently acquires parcel data associated with individual parcels. The delivery management unit 132 creates a delivery schedule for individual parcels based on the acquired parcel data, assigns parcels to delivery persons in accordance with the delivery schedule, and manages parcel flow up to delivery completion. Delivery persons include not only delivery company employees engaged fulltime in delivery work but also car-sharing users serving as temporary delivery persons.

The memory unit 14 has volatile or non-volatile memory (not shown). The memory unit 14 stores parcel data assigned to parcel IDs, as well as programs executed by the arithmetic unit 13, and various data.

The onboard terminal 20 can be configured to comprise an onboard navigation unit, for example. The onboard terminal 20 includes a communication unit 21, input-output unit 22, arithmetic unit 23 and memory unit 24. A sensor group 25 and actuators 26 are connected to the onboard terminal 20.

The sensor group 25 includes various sensors for detecting vehicle condition. By way of example, the sensor group 25 comprises a GPS sensor 251 for detecting position of the vehicle 1 using signals from GPS satellites, a vehicle speed sensor 252 for detecting vehicle speed, and a door open/close sensor 253 for detecting opening and closing of a luggage compartment door. Although not shown in the drawings, the sensor group 25 also comprises other sensors including, for example, an acceleration sensor for detecting acceleration acting on the vehicle 1, a gyro sensor for detecting angular velocity, an odometer sensor for measuring distance traveled, a fuel level sensor for detecting remaining fuel amount, and a battery charge sensor for detecting remaining battery charge.

The actuators 26 are adapted to drive various equipment (mechanisms and devices) installed in the vehicle 1 in response to instructions from the onboard terminal 20 (arithmetic unit 23). To cite a specific example, the actuators 26 include a lock actuator 261 for unlocking and locking a door lock. The lock actuator 261 unlocks or locks an associated door lock in response to an unlock signal or lock signal from the arithmetic unit 23. In addition, other actuators, for example an engine actuator, transmission actuator, braking apparatus actuator and steering actuator, are also included among the actuators 26.

The communication unit 21 is configured to communicate with the server unit 40 wirelessly via the communication network 7. The communication unit 21 sends a vehicle ID for identifying the vehicle 1, along with some of the signals received from the sensor group 25, to the server unit 40 at predetermined time intervals.

The input-output unit 22 is equipped with various user operable switches, buttons, microphone, speaker, monitor and the like. Moreover, the input-output unit 22 has a card reader 221 for reading user data from an authentication card carried by the user. As the authentication card is used, for example, a driver's license (IC card license) that stores user personal data written into an integrated circuit (IC) chip. The card reader 221 is installed at a predetermined part of the vehicle 1 (e.g., bottom of rear window) to be capable of recognizing the authentication card when brought near the vehicle from outside.

The arithmetic unit 23, which has a CPU, performs predetermined processing based on signals received through the input-output unit 22, signals detected by the sensor group 25, signals received via the communication unit 21 from outside the onboard terminal 20 and data stored in the memory unit 24, and outputs control signals to the actuators 26 of the vehicle 1, the input-output unit 22 and the memory unit 24.

In addition, the arithmetic unit 23 outputs control signals to the communication unit 21 so as to control exchange of signals between the onboard terminal 20 and the server unit 40. For example, when the user brings his or her authentication card near the card reader 221 when starting to use the vehicle, the arithmetic unit 23 transmits user data read through the card reader 221 through the communication unit 21 to the server unit 40. The server unit 40 determines presence/absence of reservation data corresponding to the received user data. When the server unit 40 determines that corresponding reservation data are present, its sends an unlock instruction to the arithmetic unit 23, and when it finds no corresponding reservation data, it sends a lock instruction. The arithmetic unit 23 sends the lock actuator 261 an unlock signal upon receiving an unlock instruction and sends it a lock signal upon receiving a lock instruction.

The memory unit 24 includes volatile memory or non-volatile memory not indicated in the drawings. Various programs executed by the arithmetic unit 23 and various data are stored in the memory unit 24. For example, the memory unit 24 temporarily stores data detected by the sensor group 25. The stored detection data are, in accordance with processing performed by the arithmetic unit 23, transmitted through the communication unit 21 to the server unit 40 at predetermined time intervals.

The user terminal 30 is configured by means of, for example, a mobile wireless terminal, typically a personal computer or smart phone, operated by the user. The user terminal 30 comprises a communication unit 31, an input-output unit 32, an arithmetic unit 33 and a memory unit 34.

The communication unit 31 is adapted to communicate with the server unit 40 wirelessly via the communication network 7. The communication unit 31 transmits to the server unit 40 user-identifying IDs as well as signals instructing reservation, reservation cancellation and the like of vehicles 1. In addition, the communication unit 31 receives from the server unit 40 data regarding parcel delivery during vehicle use, namely, parcel delivery proposal data, incentive receivable for parcel delivery data, and the like.

The input-output unit 32 has, for example, a keyboard, mouse, monitor, touch panel and so on. The user inputs user data through the input-output unit 32. User data include user address, name, contact information, driver's license number, data required for payment (settlement, e.g., credit card number), and so on. After inputting such user data and completing member registration, the user can use shared vehicles.

When applying for a vehicle reservation, the user designates vehicle type, station to be used, and date/time of using vehicle 1 (use start date/time and use end date/time). In response, the server unit 40 retrieves reservable vehicles 1 satisfying some or all of the designated vehicle type, station and use date/time conditions and transmits data of one or multiple retrieved vehicle 1 candidates to the user terminal 30. These vehicle data are displayed on the input-output unit 32. Vehicle reservation is completed (firm) when the user uses the input-output unit 32 to select a desired vehicle 1 from among displayed vehicles 1 or when the user accepts a displayed vehicle 1.

In addition, the user can use the input-output unit 32 to instruct change, cancellation and the like of vehicle reservation application and of destination data including, for example, destination, and desired destination arrival date/time and departure date/time, and to input proposal acceptance in response to any parcel delivery proposal received from the server unit 40.

The arithmetic unit 33, which has a CPU, performs predetermined processing based on signals input through the input-output unit 32, signals received through the communication unit 31 from outside the user terminal 30 and data stored in the memory unit 34, and outputs control signals to the communication unit 31, the input-output unit 32 and the memory unit 34. Processing performed by the arithmetic unit 33 enables the user to change and/or confirm reserved vehicle via the input-output unit 32 (its monitor, for example).

The memory unit 34 includes volatile memory or non-volatile memory not indicated in the drawings. Various programs executed by the arithmetic unit 33 and various data are stored in the memory unit 34.

The server unit 40 is installed at a business engaged in car-sharing service. Optionally, the server unit 40 can be configured utilizing cloud virtual server functions. The server unit 40 includes a communication unit 41, an input-output unit 42, an arithmetic unit 43 and a memory unit 44.

The communication unit 41 is adapted to communicate with the delivery terminal 10, onboard terminal 20 and user terminal 30 wirelessly via the communication network 7. The input-output unit 42 has, for example, a keyboard, mouse, monitor, touch panel and so on. The arithmetic unit 43, which has a CPU, performs predetermined processing based on signals input through the input-output unit 42, signals received through the communication unit 41 from outside the server unit 40 and data stored in the memory unit 44, and outputs control signals to the input-output unit 42 and the memory unit 44.

The memory unit 44 includes volatile memory or non-volatile memory not indicated in the drawings. Various programs executed by the arithmetic unit 43, and various data are stored in the memory unit 44. As functional constituents supporting memory function, the memory unit 44 comprises a map database 441, a vehicle database 442 and a user database 443.

The map database 441 stores map data including road position data. The map data include not only road congestion, construction, closure and similar data regarding current and expected future locations but also parking information and the like regarding parcel delivery address. These data and information are updated regularly as required.

The vehicle database 442 stores vehicle data regarding each of multiple vehicles 1 offered for car-sharing, namely, each vehicle's type, year, VIN (body number), license plate number, mileage, maintenance history, utilization rate and other vehicle data indicative of vehicle condition and vehicle properties, and also stores use schedule data of each vehicle 1. The use schedule data include past, current and future time-series reservation data of each vehicle 1.

The user database 443 stores user ID, address, name, contact information, driver's license number and other user personal data of individual users input through the user terminals 30 (input-output unit 32), and for each user also stores vehicle 1 use history, accident history and traffic violation history, plus data indicating user reliability (reliability data), such as parcel delivery history and the like. Namely, the user database 443 stores individual user data in association with user ID. Reliability rating decreases with each traffic violation and is higher in proportion as traffic violation degree (severity) is lower. Reliability rating is also increased in case of user having a history of proper parcel delivery.

As functional constituents supporting processor function, particularly as constituents related to parcel delivery during car-sharing use, the arithmetic unit 43 comprises a data acquiring unit 431, a violation determining unit 432, a route calculating unit 433, a deliverability determining unit 434, an incentive deciding unit 435, an output unit 436 and a delivery completion determining unit 437.

The data acquiring unit 431, which is adapted to acquire various data via the communication network 7, comprises as functional constituents an application data acquiring unit 431*a*, a parcel data acquiring unit 431*b*, a vehicle data acquiring unit 431*c* and a user data acquiring unit 431*d*.

The application data acquiring unit 431*a* acquires vehicle use application data input by users through the input-output units 32 of the user terminals 30. These application data include vehicle type, vehicle 1 planned use start date/time and planned return date/time, and, in addition, data regarding destination during vehicle use, namely, data regarding destination address, planned destination arrival date/time and the like. The parcel data acquiring unit 431*b* acquires parcel data transmitted from the delivery terminal 10, together with associated parcel ID. The vehicle data acquiring unit 431*c* acquires vehicle data stored in the vehicle database 442, and after completion of vehicle turnover-to-user processing, acquires vehicle data transmitted from the onboard terminal 20, together with associated vehicle ID. The user data acquiring unit 431*d* acquires from the user database 443 user data associated with user ID transmitted from the user terminal 30.

The violation determining unit 432 uses signals acquired by the sensor group 25 of the onboard terminal 20 to determine whether the user of the vehicle 1 violated a traffic regulation. For example, the violation determining unit 432 determines current position of the vehicle 1 based on a signal from the GPS sensor 251 and determines whether the user is violating speed limit by comparing vehicle 1 speed limit at current position of the vehicle 1 and vehicle speed indicated by a signal from the vehicle speed sensor 252. Optionally, parking violation can be determined by using signals from the GPS sensor 251 to determine whether the vehicle 1 is parked at a place where parking is prohibited. When a traffic violation is determined, user's reliability data are updated by lowering the user's reliability rating stored in the user database 443.

The route calculating unit 433 uses map data stored in the map database 441 to calculate or compute an efficient target route from the station 2 where the vehicle 1 reserved by the user is parked to the destination 3, namely, to calculate direct route segment R4 (FIG. 1). In some cases, the route calculating unit 433 calculates a number of different direct route segments R4 with priority on distance, time, road width or some other condition.

The deliverability determining unit 434 uses vehicle 1 application data acquired by the application data acquiring unit 431*a* and parcel data acquired by the parcel data acquiring unit 431*b* to determine whether a parcel deliverable by the user using the reserved vehicle 1 exists. Specifically, the deliverability determining unit 434 first calculates detour route segments R1 to R3 in the case of parcel transport (FIG. 1), and thereafter calculates distance difference between direct route segment R4 calculated by the route calculating unit 433 and detour route segments R1 to R3 and calculates time difference between estimated time required to traverse direct route segment R4 from the station 2 to destination 3 and estimated time required to traverse detour route segments R1 to R3 from the station 2 to destination 3. And a deliverable parcel is determined to exist when there is a parcel that meets the conditions of desired parcel delivery date/time included in the associated parcel data being within use date/time of the vehicle 1, of size of the parcel being no larger than luggage compartment capacity of the vehicle 1, of distance difference being not greater than a predetermined threshold (distance difference threshold) and of time difference being not greater than a predetermined threshold (time difference threshold).

Rather than defining simultaneous satisfaction of the distance difference and time difference requirements as a necessary condition, it is alternatively possible to define satisfaction of one or the other of the distance difference and time difference requirements as a condition determining whether a deliverable parcel exists. When the deliverability determining unit 434 determines that a deliverable parcel exists, it further determines, with consideration to user data acquired by the user data acquiring unit 431*d*, whether the user can transport the parcel concerned. Specifically, the deliverability determining unit 434 determines whether user reliability indicated by user's reliability data is at least a predetermined value. Determination by the deliverability determining unit 434 of presence/absence of a deliverable parcel amounts to determining whether the user satisfies parcel transport requirements.

Among users, some may be inclined to receive incentives by delivering parcels even if by a longer roundabout route. So by including such user inclinations in the user data, distance difference thresholds and time difference thresholds can be set in accordance with inclinations of individual users. Optionally, for example, distance difference thresholds and time difference thresholds can be weighted by multiplication by a coefficient greater than 1. Moreover, the number of parcels that the deliverability determining unit 434 determines to satisfy the parcel transport requirements need not be limited to 1 but can be 2 or greater. The number of distribution centers 5 and delivery addresses 6 associated with parcels can therefore also be greater than 1. In the case of multiple parcels satisfying the parcel transport requirements, higher priority can be assigned in proportion as distance difference and time difference between detour route segments R1 to R3 and direct route segment R4 associated with each parcel are shorter.

When the deliverability determining unit 434 determines existence of a deliverable parcel, the incentive deciding unit 435 decides an incentive to be offered the user for delivering the parcel. For example, the incentive deciding unit 435 uses parcel data acquired by the parcel data acquiring unit 431*b* to ascertain delivery fee obtained by the delivery company upon delivering the parcel, multiplies the delivery fee by a fixed percentage to calculate a vehicle rental fee discount and decides the value of this discount (discount amount) as the incentive to be offered the user. Optionally, a predetermined discount (fixed amount) unrelated to the delivery fee can be decided as the incentive offered the user. The discount decided by the incentive deciding unit 435 is deducted from the fee for car-sharing use of the vehicle 1, so that the user's payment burden is reduced proportionally.

When the deliverability determining unit 434 determines existence a deliverable parcel, the output unit 436 outputs parcel data and information proposing delivery of the parcel (delivery proposal data) to the user terminal 30. The incentive data decided by the incentive deciding unit 435 is output simultaneously at this time. When the deliverability determining unit 434 determines existence of multiple deliverable parcels, the output unit 436 outputs parcel data and corresponding incentive data for each of the multiple parcels. This information and data are, for example, displayed on the user terminal 30 (the input-output unit 32), and when the user inputs a parcel delivery accept instruction via the input-output unit 32, the user is assigned status of a temporary delivery person with respect to the parcel concerned.

When the user is assigned delivery person status, the output unit 436 outputs user information (user data) stored in the user database 443 to the delivery terminal 10 as parcel assignment data. As a result, the delivery company can manage the parcel and delivery person (vehicle user) in association with each other. In addition, the output unit 436 outputs to the onboard terminal 20 map data including position data of the detour route segments R1 to R3 during parcel delivery. As this enables display of a recommended route passing through the parcel collection point and the delivery address on the monitor of the navigation unit, the user can easily carry out parcel delivery.

The delivery completion determining unit 437 uses signals acquired by the vehicle data acquiring unit 431c from the GPS sensor 251 and door open/close sensor 253 to determine whether the user completed parcel delivery. Specifically, when the GPS sensor 251 detects presence of the user at the parcel delivery address 6 (FIG. 1) and the door open/close sensor 253 detects that the luggage compartment door was opened and closed, the delivery completion determining unit 437 determines that the user took the parcel out of the vehicle 1 and completed the delivery. Alternatively, whether parcel delivery was completed can be determined by detecting removal of the parcel from the luggage compartment using signals from an onboard camera. When the delivery completion determining unit 437 determines completion of parcel delivery, payment of the incentive to the user is firm and final. In this case, the output unit 436 outputs information indicating the firm and final incentive payment decision and this information is transmitted to the user terminal 30 via the communication network 7.

Figure 3:
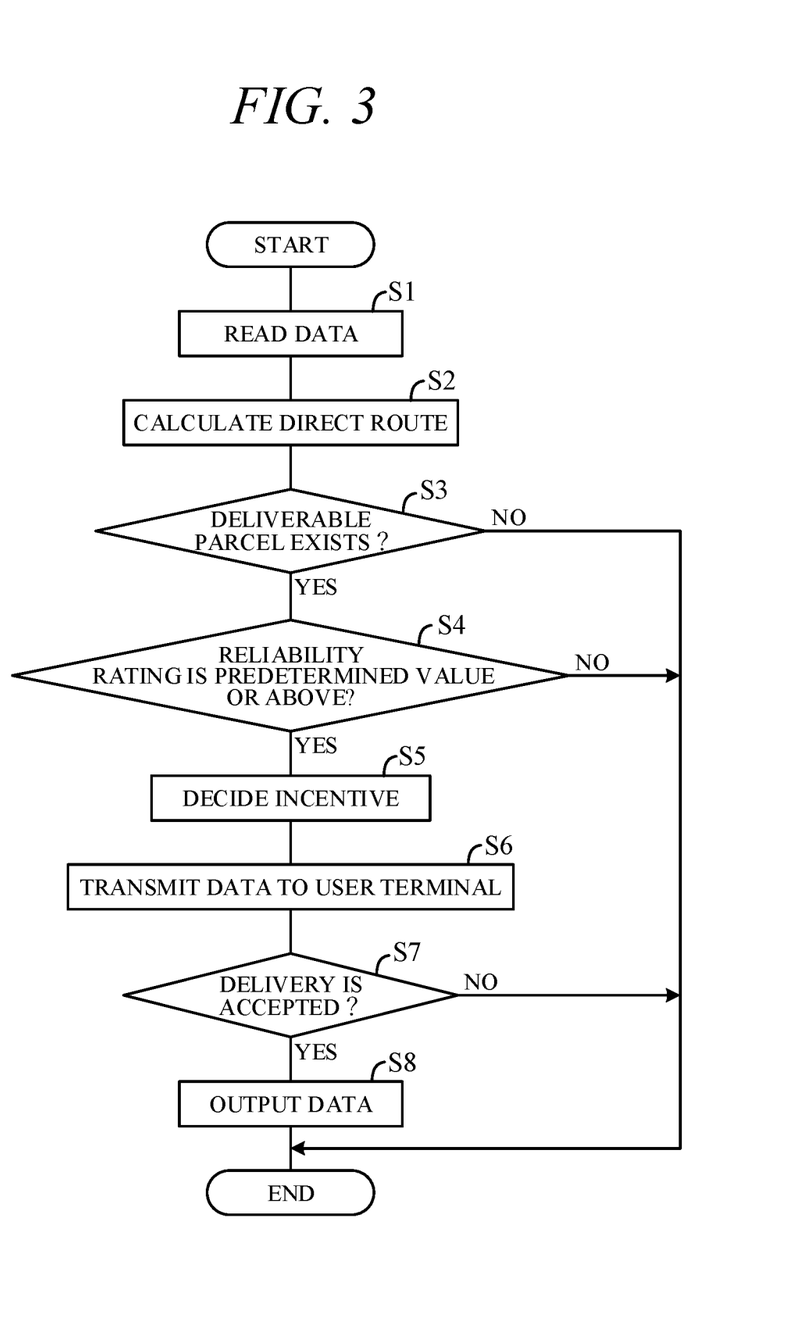
FIG. 3 is a flowchart showing an example of processing performed by an arithmetic unit of a server unit of FIG. 2.

FIG. 3 is a flowchart showing an example of processing performed by the arithmetic unit 43 of the server unit 40 in accordance with a program stored in memory in advance, specifically an example of processing related to parcel delivery using a vehicle. The processing indicated in this flowchart is started, for example, when a reservation to use a vehicle 1 is applied for through a user terminal 30 and is repeatedly performed periodically at predetermined intervals.

First, in S1 (S: processing Step), various information is read via the data acquiring unit 431. Next, in S2, the direct route segment R4 between the station 2 and the destination 3 is calculated based on map data stored in the map database 441 and reservation application data read in S1.

Next, in S3, whether a parcel that the user can deliver using the vehicle 1 exists is determined based on direct route segment R4 calculated in S2, and parcel data and vehicle data acquired in S1. Specifically, the detour route segments R1 to R3 in the case of transporting a parcel are calculated, and whether a parcel exists that meets the conditions of desired parcel delivery date/time being within user's vehicle use date/time, of parcel size being no larger than luggage compartment capacity of the vehicle 1, of distance difference between direct route segment R4 and detour route segments R1 to R3 being not greater than distance difference threshold, and of time difference between direct route segment R4 and detour route segments R1 to R3 being not greater than time difference threshold is determined. When the result in S3 is YES, the program goes to S4, and when NO, processing is terminated.

In S4, whether user reliability rating is at least a predetermined value is determined based on user data (reliability data) acquired in S1. When the result in S4 is YES, the program goes to S5, and when NO, processing is terminated. In other words, in S3 and S4 whether the user meets the parcel transport requirements is determined, and when determined to meet the parcel transport requirements, the program goes to S5 in which the parcel data are used to decide an incentive to be offered the user in the case of delivering the parcel.

Next, in S6, the incentive data decided in S5 is transmitted to the associated user terminal 30 together with the parcel data. Next, in S7, whether a parcel delivery accept instruction was transmitted from the user terminal 30 to which the incentive data was transmitted in S6 is determined. When the result in S7 is YES, the program goes to S8, and when NO, processing is terminated. In S8, parcel delivery is assigned to the user acting as a temporary delivery person, parcel assignment data are output to the delivery terminal 10, and map data including detour route segment R1 to R3 position data are output to the onboard terminal 20.

Actions of the present embodiment are summarized in the following. When vehicle 1 car-sharing application data are input through a user terminal 30, a route segment between the station 2 and destination 3 designated in the application data (direct route segment R4 of FIG. 1) is calculated (S2). In addition, whether a parcel deliverable by the user concerned exists is determined, namely, whether the user satisfies the parcel transport requirements is determined (S3 and S4). For example, the parcel transport requirements are determined to be satisfied when the desired parcel delivery date/time is included within use date/time of the vehicle 1, the parcel is no larger than luggage compartment capacity of the vehicle 1, distance and time differences between route segments during delivery (route segments R1 to R3 of FIG. 1) and direct route segment R4 are no greater than predetermined values, and user reliability rating is at least a predetermined value.

When the parcel transport requirements are determined to be satisfied, data regarding an incentive to be received for delivering the parcel is sent to the associated user terminal 30 (S6). After considering the incentive, the user decides whether to undertake parcel delivery. The fact that the user can receive an incentive helps to motivate the user to undertake parcel delivery. Once the user inputs a parcel delivery acceptance instruction, map data including detour route segment R1 to R3 position data are transmitted to the onboard terminal 20 (S8). As route guidance along the detour route segments R1 to R3 can therefore be performed via the onboard terminal 20, the user can easily carry out parcel delivery.

The present embodiment can achieve advantages and effects such as the following:

(1) The vehicle service providing apparatus 101 according to the present embodiment is adapted to offer an incentive to a car-sharing vehicle 1 user who transports a parcel while using the vehicle. Specifically, the vehicle service providing apparatus 101 comprises: the application data acquiring unit 431a for acquiring vehicle use application data including data regarding destination during vehicle use; the map database 441 for storing map data including road position data; the route calculating unit 433 for using destination data acquired by the application data acquiring unit 431a and map data stored in the map database 441 to calculate a running route of the vehicle 1 to the destination (direct route segment R4); the parcel data acquiring unit 431b for acquiring data including fee revenue obtained for parcel delivery; the deliverability determining unit 434 for using parcel data acquired by the parcel data acquiring unit 431b and direct route segment R4 calculated by the route calculating unit 433 to determine whether parcel transport requirements are satisfied at time of user vehicle 1 use; the incentive deciding unit 435 responsive to determination by the deliverability determining unit 434 that transport requirements are satisfied for using parcel data acquired by the parcel data acquiring unit 431b to determine incentive to be offered to user; and the output unit 436 for outputting incentive data decided by the incentive deciding unit 435 to the user (FIG. 2).

This configuration enables a car-sharing user who delivers a parcel at some point on a route connecting the station 2 and the destination 3 to receive a vehicle rental fee discount or other incentive. As this motivates users to utilize car-sharing, use of car-sharing by users can be promoted. It also benefits the parcel delivery company by helping overcome shortage of delivery persons.

(2) The vehicle service providing apparatus 101 further comprises the vehicle data acquiring unit 431c that acquires vehicle data including data regarding build of the vehicles 1 available for car-sharing (FIG. 2). The deliverability determining unit 434 additionally determines, based on vehicle data acquired by the vehicle data acquiring unit 431c, whether parcel transport requirements during user's use of the vehicle 1 are satisfied. As this leads to a parcel suitable for the size of the vehicle 1 used by the user (suitable for its luggage compartment capacity, for example) being proposed for transport by the user, burden on the user is minimized.

(3) The parcel data preferably include at least some among parcel delivery address, collection point, size, weight, desired delivery time and desired collection time. This is preferable because it enables parcel transport optimally suited to vehicle use by the user to be proposed to the user.

(4) The vehicles 1 are shared vehicles rentable to multiple users, and the incentive deciding unit 435 is adapted to decide vehicle 1 rental fee discounts. In other words, the vehicle service providing apparatus of the present embodiment is applied to car-sharing. Since users who utilize car-sharing are of various types, and their destinations are also various, the vehicle service providing apparatus is amenable to broad application.

(5) The vehicle service providing apparatus 101 further comprises the user data acquiring unit 431d that acquires user data including user reliability data (FIG. 2). The deliverability determining unit 434 is additionally adapted to determine, based on data acquired by the user data acquiring unit 431d, whether parcel transport requirements are satisfied during use of the vehicle 1 by the user. As this ensures that a user whose reliability is low does not become a delivery person, the delivery company can feel at ease about employing vehicle users as delivery persons.

(6) The user data preferably include at least some among user address, parcel delivery history, vehicle accident history and traffic violation history. When the user data include user address, the delivery company can more easily call on local users familiar with local geography to deliver parcels. When the user data include delivery history data, the delivery company can minimize risk by calling on users who have delivered parcels in the past. When the user data include vehicle accident history and traffic violation history, the delivery company can minimize risk by consigning parcel transport to users who drive safely.

(7) The vehicle service providing apparatus further comprises the vehicle data acquiring unit 431c that acquires vehicle position data, plus the violation determining unit 432 for estimating, based on position data acquired by the vehicle data acquiring unit 431c, whether user data imply any traffic violation incident (FIG. 2). Since whether the user probably committed a traffic violation can therefore be determined independently of any report from the user, user reliability can be ascertained with enhanced accuracy.

(8) The vehicle service providing method according to the present embodiment for offering an incentive to a vehicle user who transports a parcel while using the vehicle comprises as steps performed by the arithmetic unit 43 functioning as a computer: a step of acquiring destination data related to user's destination (S1); a step of calculating, based on acquired destination data and map data including road position data stored in advance, a running route of the vehicle 1 to a destination (direct route segment R4) (S2); a step of acquiring parcel data including fee revenue obtained for parcel delivery (S1); steps of determining, based on acquired parcel information and calculated running route, whether parcel transport requirements during user's use of the vehicle 1 are satisfied (S3 and S4); a step, performed in response to determination that parcel transport requirements are satisfied, to decide, based on acquired parcel information, an incentive to be offered the vehicle user (S5); and a step of outputting decided incentive data to the user (S6) (FIG. 3). User utilization of car-sharing can therefore be effectively promoted.

Figure 4:
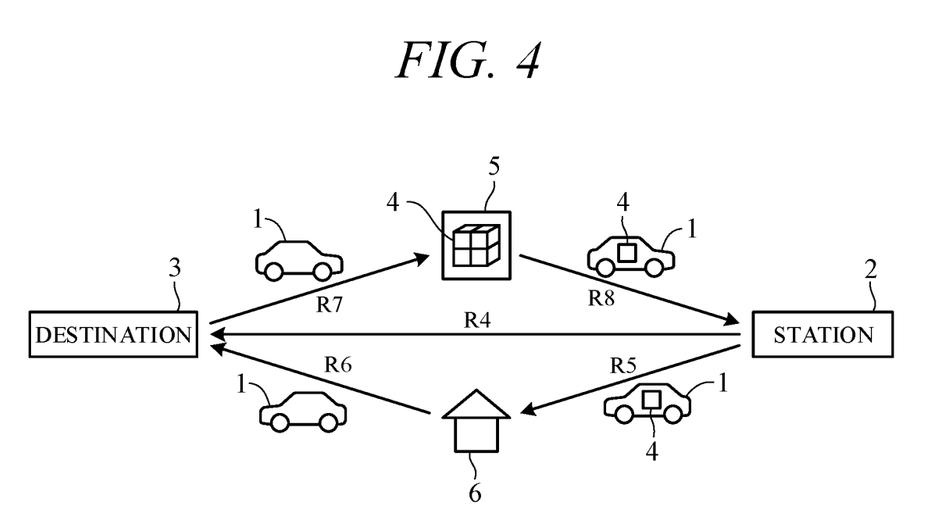
FIG. 4 is a diagram showing a modification of FIG. 1.

Various modifications of the aforesaid embodiment are possible. Some examples are explained in the following. In the aforesaid embodiment, the deliverability determining unit 434 determines possibility of parcel shipping including both collection and delivery, but the determining unit can be of any configuration insofar as it determines, based on parcel information and direct route to destination, whether parcel transport requirements are satisfied during vehicle use by vehicle user. For example, the determining unit can be adapted to determine only whether collection is possible or only whether delivery is possible. FIG. 4 is a diagram showing an example of this.

In FIG. 4, a parcel 4 is loaded in advance in a vehicle 1 parked at a station 2, for example. A user drives this vehicle 1 (via route segment R5) to a delivery address 6 (delivery point), hands the parcel 4 over to the other party at the delivery address 6, and then drives the vehicle 1 to a destination 3 (via route segment R6). The user further drives the vehicle 1 from the destination 3 to a distribution center 5 (collection point) (via route segment 7), and after picking up a parcel 4 at the distribution center 5, drives the vehicle 1 back to the station 2 (via route segment R8). This expands the range of deliverable parcels that can be proposed to the user. The user is offered an incentive even in the case of performing only delivery or only collection. Vehicle use by users is therefore promoted.

The aforesaid embodiment is configured so that when the deliverability determining unit 434 determines satisfaction of parcel transport requirements, the output unit 436 outputs parcel proposal data and incentive data, and these data are displayed on the input-output unit 32 of the user terminal 30 of the user concerned, but when the deliverability determining unit 434 determines satisfaction of transport requirements of multiple parcels, it is optionally possible to display multiple sets of parcel transport data and sets of incentive data in accordance with predetermined order. For example, the sets of data can be displayed in ascending order of distance difference and time distance relative to the direct route segment R4, i.e., in ascending order of user burden or in descending order of amount of incentive.

After the user accepts the parcel proposal data and the parcel delivery plan is firm, it is optionally possible to send the other party at the delivery address 6 information regarding the vehicle 1 used by the user (vehicle type and the like) and the user's own user data. This allows the other party at the delivery address 6 to feel easier about receiving the parcel. This is because the fact that the user does not wear a delivery company uniform may make the other party at the delivery address 6 feel suspicious about the user, but such concern of the other party can probably be alleviated by informing the party in advance of the vehicle data and/or the user data.

Packets handled by the vehicle service providing apparatus 101 of the present embodiment can be packets of goods bought and sold between individuals, particularly packets of goods traded between people in the same town or traded between people in adjacent towns. Person-to-person trading has become increasingly popular with spread of the Internet and the like in recent years and this has in turn led to increasing popularity of person-to-person trading focused on transactions within a relatively narrow region. In the case of such trading between individuals in the same region, demand is less for rapid shipment and more for low shipping rates. The vehicle service providing apparatus 101 can therefore be applied to good effect.

In the aforesaid embodiment, an incentive is decided as a discount calculated by multiplying delivery fee by a fixed percentage or as a fixed discount, but incentives (discounts) can optionally be increased in proportion as distance difference and time difference between direct route segment R4 and detour route segments R1 to R3 are greater. In such case, the deliverability determining unit 434 can be adapted to determine from the user's delivery history whether the user previously accepted delivery at a large incentive (delivery whose distance difference and time difference were large) and to propose to such a user packet delivery yielding an incentive of predetermined value or greater from the start.

Optionally, multiple packets can be collected at the distribution center 5 and delivered to multiple delivery addresses 6. Another option is to collect packets from, for example, a supermarket or other retailer instead of from the distribution center 5, and deliver the packets to multiple homes. This enables utilization as a so-called mobile supermarket that, for example, delivers packets to a number of homes in a sparsely populated area, It is also optionally possible to propose for use by the user a vehicle 1 that is a vehicle well matched to the nature of the packet the delivery company wants delivered. When the delivery company requires delivery of a large parcel, for example, it is possible in response to a request from the delivery company to propose to the user through the output unit 436 use of a minivan type vehicle having large luggage compartment capacity. Optionally, the incentive in this case can be decided to include a discount equal to the increase in vehicle rental fee owing to use of the minivan type vehicle.

In the aforesaid embodiment, the incentive deciding unit 435 is adapted to offer the vehicle user a vehicle rental fee discount as an incentive but the incentive deciding unit is not limited to this configuration. Other options include, for example, offering as an incentive a coupon or points for obtaining a service in accordance with number of points accrued. In the aforesaid embodiment, the vehicle service providing apparatus is applied to the car-sharing business, but the vehicle service providing apparatus according to the present invention can be similarly applied to other than car-sharing. For example, it can be applied to have a vehicle owner who drives from a parking lot to a destination deliver a packet via a detour route. In such case, it suffices to offer the owner remuneration in a form other than a vehicle fee discount as an incentive. In the aforesaid embodiment, the vehicle data acquiring unit 431c is adapted to acquire vehicle position data, but the vehicle data acquiring unit is not limited to this arrangement. For example, position data can optionally be acquired based on signals from a GPS sensor installed in the user terminal.

The present invention can be also used as a vehicle service providing method to offer an incentive to a user of a shared vehicle, the user delivering a parcel when using the vehicle.

The above embodiment can be combined as desired with one or more of the above modifications. The modifications can also be combined with one another.

According to the present invention, it is possible to adequately promote vehicle utilization.

Above, while the present invention has been described with reference to the preferred embodiments thereof, it will be understood, by those skilled in the art, that various changes and modifications may be made thereto without departing from the scope of the appended claims.

What is claimed is:

1. A vehicle service providing apparatus, configured to offer an incentive to a user of a shared vehicle, the user delivering a parcel when using the vehicle, the vehicle service providing apparatus comprising:
   an electronic control unit having a microprocessor and a memory connected to the microprocessor; and
   a communication unit communicable with a user terminal operated by the user, a delivery terminal owned by a delivery company engaged in a parcel delivery business, and an onboard terminal of the vehicle, wherein
   the memory is configured to perform
      storing map data including route position data, wherein the microprocessor is configured to perform:
      acquiring information via the communication unit at predetermined intervals, the information including reservation application data for using the vehicle including destination data which is sent from the user terminal and parcel data including fee revenue data for a delivery of the parcel which is sent from the delivery terminal, and the parcel data further including data of at least one of a delivery point and a collection point of the parcel;
      calculating a first route to the destination, and a second route to the destination via at least one of the delivery point or the collection point based on the map data stored and the destination data acquired;

determining whether the user satisfies a predetermined requirement for delivering the parcel when using the vehicle based on the parcel data acquired and the first route and the second route calculated;

deciding the incentive based on the parcel data acquired when it is determined that the user satisfies the predetermined requirement; and outputting incentive data of the incentive decided to the user terminal via the communication unit so that the incentive data is displayed on a monitor included in the user terminal, and wherein the microprocessor is further configured to perform the outputting including, when the user satisfies predetermined requirements for a plurality of parcels, outputting the parcel data and the incentive data corresponding to each of the plurality of parcels to be displayed in accordance with a predetermined order, and wherein the predetermined order includes an ascending order of amount of the incentive, a descending order of a distance difference between the first route and the second route, or a descending order of a time distance between an estimated time required to traverse the first route to the destination and an estimated time required to traverse the second route to the destination, and wherein the vehicle includes the onboard terminal connected to a GPS sensor to detect position of the vehicle and a door open/close sensor to detect opening and closing of a luggage compartment door of the vehicle, and wherein the microprocessor is further configured to perform:

acquiring a signal of the GPS sensor and a signal of the door open/close sensor which are sent from the onboard terminal at predetermined time intervals; and determining whether the user has completed delivery of the parcel based on the signal of the GPS sensor and the signal of the door open/close sensor, and wherein the outputting including outputting, when the completion of the delivery of the parcel is determined, information indicating a firm and final decision of payment of the incentive to the user terminal via the communication unit.

2. The vehicle service providing apparatus according to claim 1, wherein the microprocessor is further configured to perform acquiring vehicle data including data of a build of the vehicle, wherein the microprocessor is configured to perform the determining including determining whether the user satisfies the predetermined requirement based on the vehicle data acquired.

3. The vehicle service providing apparatus according to claim 1, wherein the parcel data further includes data of at least one of size, weight, desired delivery time, and desired collection time of the parcel.

4. The vehicle service providing apparatus according to claim 1, wherein the vehicle is available for use by a plurality of users, wherein the microprocessor is configured to perform the deciding including deciding a discount amount of a rental fee of the vehicle as the incentive.

5. The vehicle service providing apparatus according to claim 1, wherein the microprocessor is further configured to perform acquiring user data including reliability data indicating a reliability rating of the user, wherein the microprocessor is configured to perform the determining including determining whether the user satisfies the predetermined requirement based on the user data acquired.

6. The vehicle service providing apparatus according to claim 5, wherein the user data further includes data of at least one of address, parcel delivery history, vehicle accident history, and traffic violation history of the user.

7. The vehicle service providing apparatus according to claim 6, wherein the microprocessor is further configured to perform:

acquiring position data of the vehicle or the user; and determining whether the user has violated a traffic regulation based on the position data acquired.

8. The vehicle service providing apparatus according to claim 1, wherein the microprocessor is further configured to perform:

the determining whether the user completed the delivery of the parcel comprises detecting presence of the user at a parcel delivery address based on the signal of the GPS sensor, and detecting the luggage compartment door was opened and closed based on the signal of the door open/close sensor.

9. The vehicle service providing apparatus according to claim 1, wherein the parcel data further includes information regarding a desired parcel delivery date/time, and the microprocessor is further configured to perform the determining including when the desired parcel delivery date/time is included within use date/time of the vehicle indicated by the reservation application data, the distance difference is equal to or less than a first threshold, and the time difference is equal to or less than a second threshold, determining that the user satisfies the predetermined requirement for delivering the parcel.

10. A vehicle service providing method of an apparatus configured to offer an incentive to a user of a shared vehicle, the user delivering a parcel when using the vehicle, wherein the apparatus includes a communication unit communicable with a user terminal operated by the user, a delivery terminal owned by a delivery company engaged in a parcel delivery business, and an onboard terminal of the vehicle, wherein the vehicle includes the onboard terminal connected to a GPS sensor to detect position of the vehicle and a door open/close sensor to detect opening and closing of a luggage compartment door of the vehicle, the vehicle service providing method comprising:

storing map data including route position data;

acquiring information via the communication unit at predetermined intervals, the information including reservation application data for using the vehicle including destination data which is sent from the user terminal and parcel data including fee revenue data for a delivery of the parcel which is sent from the delivery terminal, and the parcel data further including data of at least one of a delivery point and a collection point of the parcel;

calculating a first route to the destination, and a second route to the destination via at least one of the delivery point or the collection point based on the map data stored and the destination data acquired;

determining whether the user satisfies a predetermined requirement for delivering the parcel when using the vehicle based on the parcel data acquired and the first route and the second route calculated;

deciding the incentive based on the parcel data when it is determined that the user satisfies the predetermined requirement; and outputting incentive data of the incentive to the user terminal via the communication unit so that the incentive data is displayed on a monitor included in the user terminal, and wherein the outputting including, when the user satisfies predetermined requirements for a plurality of parcels, outputting the parcel data and incentive data corresponding to each of the plurality of parcels to be displayed in accordance with a predetermined order, and wherein the predetermined order includes an ascending order of amount of the incentive, a descending order of a distance difference between the first route and the second route, or a descending order of a time distance between an estimated time required to traverse the first route to the destination and an estimated time required to traverse the second route to the destination, and further comprising:

acquiring a signal of the GPS sensor and a signal of the door open/close sensor which are sent from the onboard terminal at predetermined time intervals; and determining whether the user has completed delivery of the parcel based on the signal of the GPS sensor and the signal of the door open/close sensor, and wherein the outputting including outputting, when the completion of the delivery of the parcel is determined, information indicating a firm and final decision of payment of the incentive to the user terminal via the communication unit.

\* \* \* \* \*